(12) United States Patent
Schlecht et al.

(10) Patent No.: US 6,926,206 B2
(45) Date of Patent: Aug. 9, 2005

(54) AIR HEATING DEVICE FOR INTEGRATION INTO AN AIR-CONDUCTING HOUSING ARRANGEMENT

(75) Inventors: Patric Schlecht, Ostfildern (DE); Andreas Collmer, Ostfildern (DE)

(73) Assignee: J. Eberspacher GmbH & Co KG, Esslingen (DE)

( * ) Notice: Subject to any disclaimer, the term of this patent is extended or adjusted under 35 U.S.C. 154(b) by 0 days.

(21) Appl. No.: 10/388,859

(22) Filed: Mar. 14, 2003

(65) Prior Publication Data

US 2003/0173413 A1 Sep. 18, 2003

(30) Foreign Application Priority Data

Mar. 15, 2002 (DE) ......................................... 102 11 591

(51) Int. Cl.[7] .................................................. B60H 1/02
(52) U.S. Cl. ............................. 237/12.3 C; 237/12.3 B; 165/41; 165/42
(58) Field of Search ........................ 237/12.3 R, 12.3 C; 165/41, 42

(56) References Cited

U.S. PATENT DOCUMENTS

| 1,947,716 | A | * | 2/1934 | Hyatt | 454/163 |
|---|---|---|---|---|---|
| 2,579,507 | A | * | 12/1951 | MacCracken | 237/2 R |
| 4,216,759 | A | * | 8/1980 | Friedl et al. | 126/110 B |
| 4,471,754 | A | * | 9/1984 | Galtz | 126/110 B |
| 4,590,888 | A | * | 5/1986 | Mosig | 122/149 |

FOREIGN PATENT DOCUMENTS

| DE | 1 579 693 | 8/1970 | ............ F24C/3/01 |
|---|---|---|---|
| DE | 3400048 C2 | 3/1988 | ............ F24H/9/02 |
| GB | 478771 | 1/1936 | |
| GB | 478771 | 1/1938 | |
| JP | 63141818 | 6/1988 | ............ B60H/1/03 |

* cited by examiner

Primary Examiner—Derek S. Boles

(57) ABSTRACT

An air heating device for integration into an air-conducting housing arrangement, particularly a housing arrangement of a vehicle air conditioner, includes a burner region, a heat exchanger region with a heat exchanger body, wherein in the heat exchanger body a combustion exhaust gas conducting space is constituted in which flow the hot combustion exhaust gases produced in the combustion in the burner region. At an outer side of the heat exchanger body a heat transfer rib arrangement with numerous heat exchange ribs for the air conducted in the housing arrangement to flow around; wherein at least a portion of the heat transfer ribs are constituted separately from the heat exchanger body and are kept in heat transfer contact with this.

29 Claims, 5 Drawing Sheets

AIR HEATING DEVICE FOR INTEGRATION INTO AN AIR-CONDUCTING HOUSING ARRANGEMENT

CROSS-REFERENCES TO RELATED APPLICATIONS

Not applicable.

STATEMENT REGARDING FEDERALLY SPONSORED RESEARCH OR DEVELOPMENT

Not applicable.

BACKGROUND OF THE INVENTION

The present invention relates to an air-heating device for integration into an air-conducting housing arrangement, particularly a housing arrangement of a vehicle air conditioner.

When integrating additional system components into a vehicle, there exists the endeavor, both because of limited construction space and also on cost grounds, to provide constructional arrangements which are as small as possible by combining different system regions, in which improved interchangeability is attained by merging functions or by common use of different system components. Since however different system components or system regions are frequently supplied by different suppliers, and these different components or system regions are in general also differently constituted for different vehicle types, it is difficult to ensure that such combination is possible for different systems to be constructed.

SUMMARY OF THE INVENTION

The present invention has as its object to supply an air-heating device, which can be adapted in a simple manner for integration into an air-conducting housing arrangement, for example, a housing arrangement of a vehicle air conditioner.

According to the present invention, this object is solved by an air heating device for integration into an air-conducting housing arrangement, in particular a housing arrangement of a vehicle air conditioner, including a burner region; a heat exchanger region with a heat exchanger body; constituted in the heat exchanger body, a combustion exhaust gas conducting space, in which flow the hot combustion gases produced in the burner region; a heat transfer rib arrangement on an outer side of the heat exchanger body, with numerous heat transfer ribs around which flows air conducted in the housing arrangement; wherein at least a portion of the heat transfer ribs are constituted separately from the heat exchanger body and are kept in heat transfer contact therewith.

Components of an air-heating device, which take up considerable space, are the ribs serving for heat transfer to the air to be heated. The greater the heat transfer surface of these ribs around which flow can occur, the more efficiently can the heat be utilized which is generated in the air heating device. The present invention now provides for a high degree of variability in the region of these heat transfer ribs, since these are at least partially constituted separately and thus can be selected or shaped to match a respective housing arrangement into which the air heating device is to be integrated. The other important and notably expensive components of the air heating device, such as, e.g., the heat exchanger region and the burner region, can be retained unchanged here as a basic type for numerous different housing arrangements provided for integration, considerably reducing the integration costs.

For example, the air heating device according to the invention can be constructed such that the heat exchanger body is elongate in the direction of a body longitudinal axis, and that at least a portion of the heat transfer ribs for the air to be heated provide a heat transfer surface arranged substantially orthogonally of the body longitudinal axis. In order to make the coupling of the heat transfer ribs to the heat exchanger body possible in a simple manner, with the attainment of a good heat transfer contact between these assemblies, it is proposed that the heat transfer rib arrangement includes at least one heat transfer rib module, and that the at least one heat transfer rib module includes a coupling region constituted for thermal coupling to the heat exchanger body and also at least one heat transfer rib adjoining the coupling region. The heat transfer contact can thereby be further improved in that the heat exchanger body has on its outside for each coupling region of a heat transfer rib module an abutment structure adapted to the shape of the coupling region. For example, it is possible that the coupling region of the at least one heat transfer rib module and the associated abutment structure are constituted elongate and at least locally curved.

To fix the at least one heat transfer rib module to the heat exchanger body, a retaining clamp can be provided, engaging the coupling region of this at least one heat transfer module. In order to design the whole structure as simply as possible, it can be provided that the retaining clamp arrangement includes a retaining clamp element with several retaining clamp sections for fixing several heat transfer rib modules to the heat exchanger body. Alternatively it is of course also possible to materially connect at least one heat transfer module to the heat exchanger body; here, for example, a connection which is very advantageous as regards the heat transfer characteristic between the heat exchanger body and the at least one heat transfer rib module can be produced by soldering. This material connection can of course also be produced by adhesion.

In order to keep the number of components to be connected together as small as possible, it is proposed that the at least one heat transfer rib module includes two heat transfer ribs connected together by the coupling region and situated substantially mutually parallel. Alternatively, in an embodiment which is very simple to produce, it is possible for the at least one heat transfer rib module to have a bushing-like coupling region to be positioned surrounding the heat exchange body on its outside, and adjoined by a substantially disk-like heat transfer rib. In order to obtain easy access, on or after combination of an air heating device according to the invention with a housing arrangement receiving it, to system components which are possibly to be interchanged or maintained in operation, it is proposed that a fastening arrangement is provided in a connection region of the heat exchanger body to the burner region, for fixing to the housing arrangement such that the heat exchanger body comes to be situated substantially within an air-conducting volume region of the housing arrangement and the burner region comes to be situated substantially outside the air-conducting volume region of the housing arrangement.

According to a further embodiment, which provides a substantial aspect of the present invention independently of the provision of separately constituted heat transfer ribs, it can be provided that an exhaust gas outlet section is provided at a region of the hear exchanger body to be positioned outside an air-conducting region of the housing arrangement. It is ensured in this manner that no connection places have to be provided in the air-conducting volume region of the housing arrangement between two duct sections of a duct that conducts exhaust gas. The danger of combustion gases getting into the air stream to be heated and then delivered to the vehicle interior if a leak occurs can thus be completely excluded.

In the air-heating device according to the invention, it can further be provided that the heat exchange body is constituted with its longitudinal extent for positioning substantially orthogonally to an airflow device in an air-conducting volume region of the housing arrangement.

The combustion gases produced in the burner region transfer a substantial portion of their thermal energy to the heat exchange body when they flow through the heat exchange body. The combustion exhaust gases then cool down, with the consequence that the volume occupied by the exhaust gases decreases, or respectively the exhaust gas pressure decreases. However, in order to provide a constant heat transfer characteristic over the whole heat exchange body, it is proposed that the heat exchange body provides a flow cross section which decreases in the direction away from the burner region, for combustion gases leaving the burner region.

According to a further aspect, the present invention relates to a combination of an air-conducting housing arrangement, particularly of a vehicle air conditioner, with an air heating device, where the air heating device has a burner region positioned outside an air-conducting volume region of the housing arrangement and a heat exchanger body positioned extending into the air-conducting volume region of the housing arrangement.

In order to be able to attain a very efficient heat transfer interaction with the air stream conducted in the housing arrangement, it is proposed that the heat exchange body is positioned with its longitudinally extending direction substantially orthogonal to a flow direction of an air stream passing through the air-conducting volume region of the housing arrangement.

Furthermore, it can also be provided in this combination that, an exhaust gas outlet region is constituted on the heat exchange body in a region thereof positioned outside the air-conducting volume region of the housing arrangement.

According to a further aspect of the present invention, it is proposed that the burner region has a fan arrangement for introducing combustion air into the said region, and that for operating the air heating device as an auxiliary heating device, the fan arrangement of the burner region and additionally to this a vehicle fan arrangement are activated for forwarding an air stream through the air-conducting volume region of the housing arrangement. It is made possible in this manner for the air stream that is introduced into the burner region for performing the combustion therein, and the air stream to be heated and conducted in the housing arrangement, to be adjusted independently of one another.

BRIEF DESCRIPTION OF THE DRAWINGS

The present invention is described in detail hereinafter with reference to the accompanying drawings and using preferred embodiments.

DETAILED DESCRIPTION OF THE INVENTION

Figure 1:
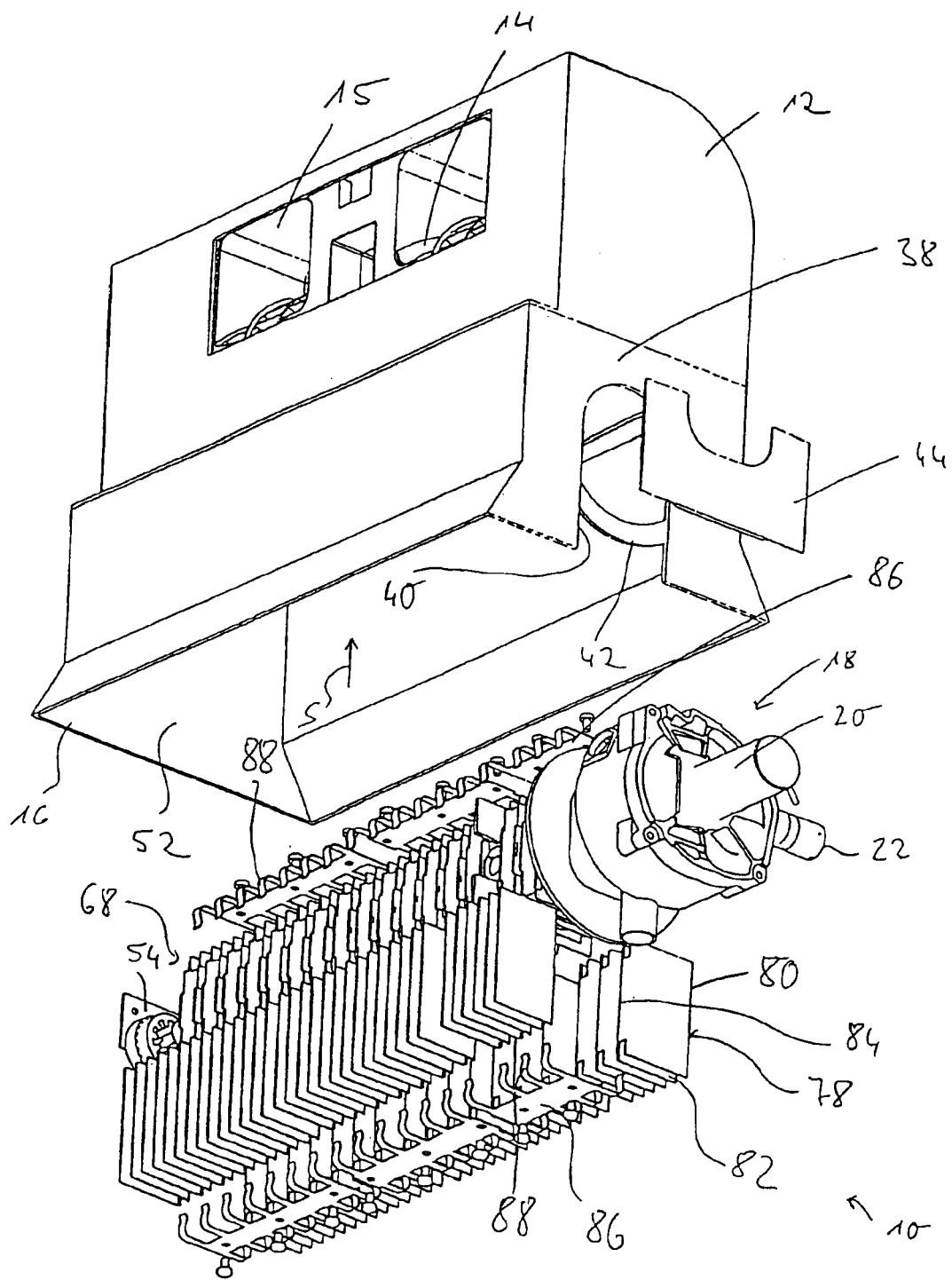
FIG. 1 shows a perspective exploded view of an air-heating device according to the invention and of a housing arrangement receiving this.

An air heating device 10 according to the invention, which is in general constituted for insertion into a housing arrangement generally denoted by 12, is shown in FIG. 1 in a partially exploded view. The housing arrangement 12 is, for example, a housing arrangement also receiving a fan 14 (only partially visible) and if necessary an air conditioning unit of a vehicle, and has at its lower region an elongate approximately rectangular receiving aperture 16 into which the air heating device 10 can be introduced when fitting together the air heating device 10 and the housing arrangement 12. The treated air leaves the housing in the region of an air outlet 15.

The air-heating device 10 includes a burner region generally denoted by 18, the internal structure of which is described in more detail hereinafter with reference to the embodiment shown in FIGS. 4 and 5. Basically it is however mentioned that the burner region 18 is of conventional construction and has a combustion air fan 20 that takes in combustion air via a combustion air inlet section 22 and delivers it into a combustion chamber 24. Fuel is introduced into the combustion chamber 24 by means of a fuel supply duct, not shown in these Figures, and is combusted with the combustion air, so that the combustion flame or the combustion exhaust gases, after flowing through a flame diaphragm 26 and a flame tube 28, enter an elongate internal space 32 formed in a heat exchange body 30. The heat exchange body 30, for example made of aluminum in a casting process, has in its end region 34 connected to the burner region 18 a fastening flange 36 which serves to fix the air heating device 10 to a sidewall 38 of the housing arrangement 12. In this region, the sidewall 38 of the housing arrangement 12 has an opening 40 through which the heat exchange body 30 passes. The fastening flange 36 is situated on the inside of the sidewall 38 with interposition of a sealing element 42. After the insertion of the air heating device into the housing arrangement 12, the not yet closed region of the opening 40 in the sidewall 38 is closed with a covering element 44, so that the air stream conducted in the housing arrangement 12 cannot escape in the region of this opening 40. After the assembly of the air heating device 10 with the housing arrangement 12, the burner region 18, together with the heat exchanger body 32 end region 34 extending out over the fastening flange 36, is situated outside the housing arrangement 12, while the remaining and substantial length section 46 of the heat exchange body 30 is situated inside the housing arrangement 12 and extends substantially orthogonally of the flow direction S of the air stream conducted in the housing arrangement 12. A fastening arbor 50 is integrally formed on the heat exchange body 30 at its end region 48 remote from the burner region 18, and can be inserted into a corresponding seating 54 on the further sidewall 52 of the housing arrangement 12. The air-heating device 10 is then firmly connected at both ends with the housing arrangement 12.

The combustion gases entering the interior 32 of the heat exchanger body 30 flow in the direction of the end region 34 to the end region 48 and transfer their heat there to the inner surface of the heat exchanger body 30, which is further enlarged by the provision of ribs 56 extending in the direction between the two end regions 34, 48. The inner region 32 is divided into two regions 60, 62 by means of a separating element 58, which can be made of sheet metal, for example, and likewise extends between the two end regions 34, 48. The hot combustion exhaust gases leaving the flame tube 28 flows into the region 60 and move toward the end region 48. Having arrived there, the combustion exhaust gases are deflected by the end wall region 64 of the heat exchanger body 30 and now arrive in the space region 62, in which they flow back again toward the burner region 18. An exhaust gas discharge pipe 66, through which the combustion exhaust gases can leave the inner space 32, or the space region 62 of the same, is integrally formed on the end region 34 of the heat exchanger body 30, to be positioned outside the housing arrangement 12.

Figure 2:
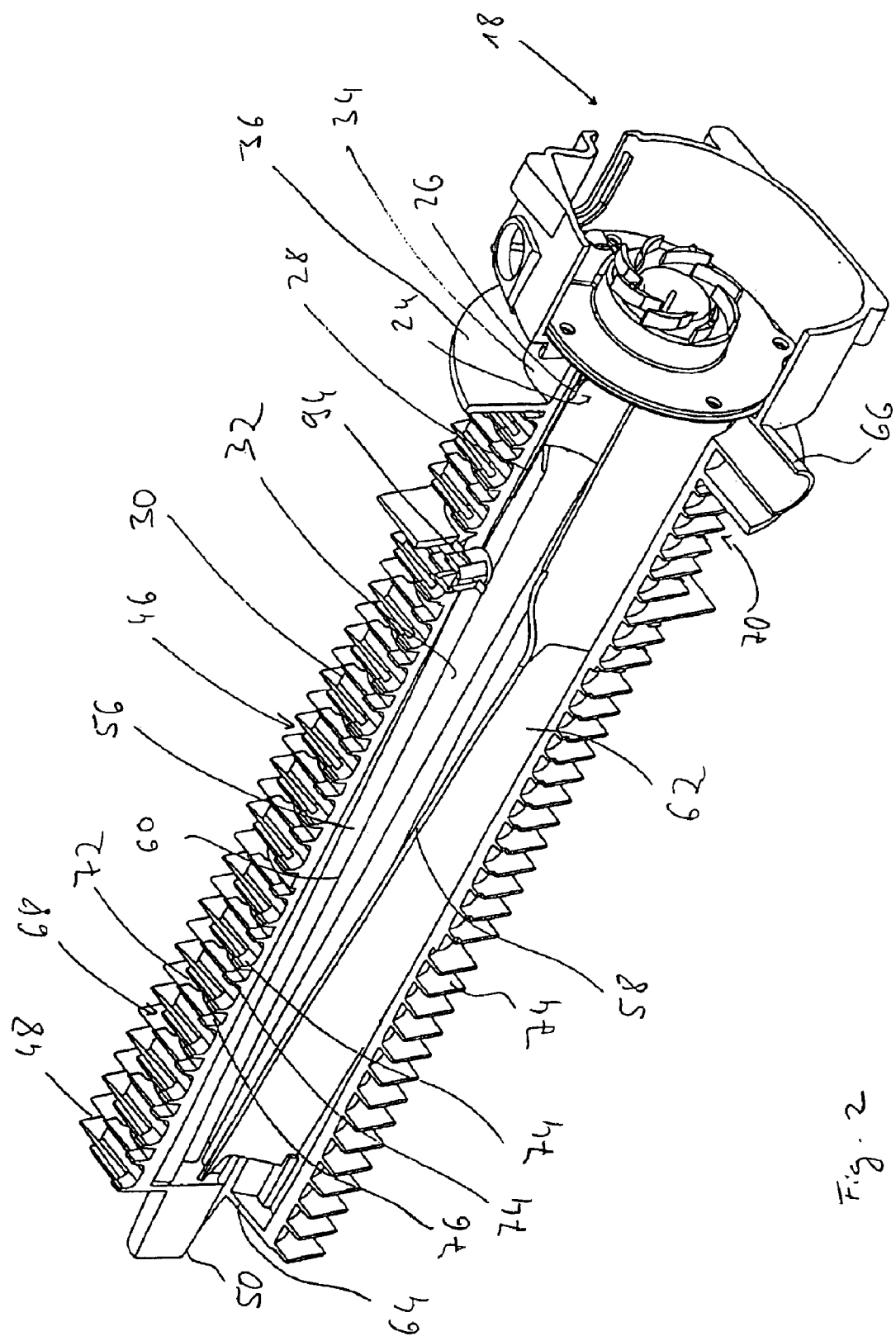
FIG. 2 shows a perspective view, partially cut away, of the air-heating device shown in FIG. 1, without a heat transfer rib module provided thereon.

It can be seen in FIG. 2 that the section of the heating device 10 according to the invention to be positioned within the housing arrangement 12 is completely closed against outlet of combustion gases, since no transition place formed by sitting any components together is present there. The combustion air supply, the fuel supply, and the discharge of exhaust gas all take place in regions outside the housing arrangement 12, i.e., all duct transition places are situated outside the housing arrangement 12. The danger of combustion exhaust gases, fuel, or other impurities reaching the air to be heated, which is conducted within the housing arrangement 12, is thus substantially completely excluded. Furthermore, the embodiment according to the invention ensures that all system components possibly relevant for repair or maintenance processes are situated outside the housing arrangement 12. This relates above all to the burner region 18, in which a glow ignition pin (not shown) or the like component may have to be changed after a predetermined operating life. A service-friendly overall arrangement thus results.

It can furthermore be seen that the heat exchanger body 30 is constituted with a surface structure on its outside. It can above all be seen that at both its regions 68, 70 to be positioned substantially transversely of the flow direction S, i.e., with side normals approximately orthogonal to the flow direction S, depression regions 72 are formed, extending in the flow direction S, having an elongate and partially rounded profile, and mutually separated by respective web or rib regions 74 extending also at the other side regions of the heat exchanger body 30. These web or rib regions 74 are respectively grouped together pair wise, so that an interspace 76 is present between each pair of such web or rib regions 74. The rib regions furthermore serve to increase the external surface.

Figure 3:
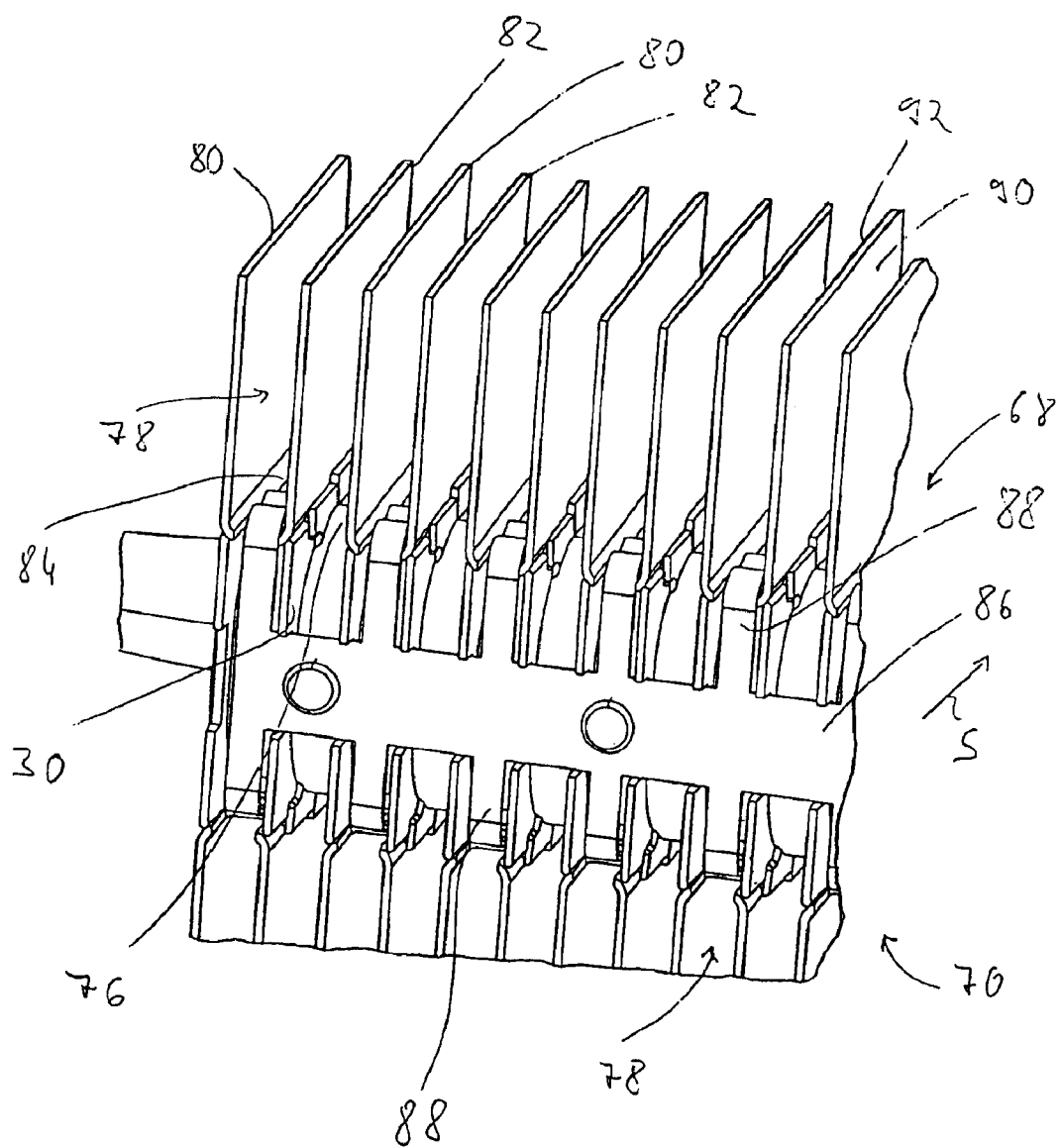
FIG. 3 shows a partial view of a heat exchange body of the air-heating device with heat transfer rib modules installed thereon.

The depressions 72 serve for the seating or abutment of heat transfer rib modules 78, which can be seen in FIGS. 1 and 3, and make sure of a large abutment surface, which is decisive for good heat transfer. Each of these heat transfer rib modules 78 includes two heat transfer ribs 80, 82 situated approximately mutually parallel and constituted with approximately rectangular shape, and connected together in a connecting section 84 shaped corresponding to the rounded shaping of the depression regions 72. These heat transfer modules 78 can be formed, for example, from sheet metal blanks by stamping out and then bending. In the assembled state, such a heat transfer module 78 is arranged, preferably in each of the depressions 72 formed along the heat exchanger body 30. The result is a configuration which can also be clearly seen in FIG. 3, and in which the different heat transfer modules 78 are situated adjacently at the two already mentioned sides 68, 70 of the heat exchanger body 30, so that a respective heat transfer rib 80 of a heat transfer rib module 78 is situated near a heat transfer rib 82 of a neighboring heat transfer rib module 78. A uniform distance between the heat transfer ribs 80, 82 following one another in the length direction of the heat exchanger body 30 are ensured because of the already mentioned interspaces 76 between the respective depressions 72.

Retaining clamp elements 86 which can be fixed to the sides of the heat exchanger body 30 situated between the sides 68, 70 serve to fix the heat transfer rib module 78. These retaining clamp elements 86, which can be fixed to the heat exchanger body 30, for example by screw bolts or clinch bolts, have a retaining clamp section 88 allocated to each heat transfer rib module 78, engaging between the two heat transfer ribs 80, 82 of a respective module and because of its elasticity or its elastic prestress presses the connecting section 84 firmly against the floor of the associated depression 72. Thus each heat transfer rib module 78 is firmly held in the two ends of its connecting section 84 respectively by means of a retaining clamp section 88 of a retaining clamp element 86.

Due to the separate mounting of the various heat transfer rib modules 78 on the heat exchanger body 30, it becomes possible to adapt the size and the number of the heat transfer rib modules 78 to be provided, or the heat transfer ribs 80, 82 themselves, to the spatial conditions predetermined by the housing arrangement 12. Thus the air heating device 10 according to the invention can be adapted, without extensive fitting measures in substantial and costly system components of the same, in a simple manner to different sizes of housing arrangements 12, in that solely the heat transfer ribs are correspondingly selected or formed. After the assembly of the heat transfer rib module 78 with the heat exchanger body 30 and the insertion of the air heating device 10 into the housing arrangement 12, the heat transfer ribs 80, 82 then provide respective heat transfer surfaces 90,92 on both sides 68, 70 of the heat exchanger body 30 at which the air stream flowing through the housing arrangement 12 is moved past at the heat exchanger body 30, which said surfaces are situated approximately parallel to the flow direction S of this air stream. The heat transfer ribs extend further, preferably with their longer extension lengths in the flow direction S, so that a very large heat transfer path can be provided, as small as possible a flow resistance being introduced because of the abovementioned parallel arrangement. It can furthermore be seen in FIG. 2 that a temperature sensor 94 is provided on the outside of the heat exchanger body 30 and provides a temperature signal which can be used for controlling the burner region 18.

An air-heating device is provided by the construction described hereinabove, which in a simple manner can be adapted for integration in housing arrangements of different shapes or different sizes. In spite of the separate embodiment of the heat transfer ribs or of the heat exchanger module having these, a very efficient heat transfer is ensured between the system regions in the transition region between the heat exchanger body and the heat transfer rib modules because of the large surface abutment contact in the depressions or abutment regions provided therefore.

By the combination of a vehicle air conditioning device with an air heating device in a housing arrangement, there is attained, besides the advantage of considerable space saving, also a marked increase of versatility in operation. Thus the air-heating device can be used, not only as an auxiliary heater, but also of course in supplementary heating operation and in circulating air operation. A corresponding very rapid temperature adjustment or air humidity regulation is also possible by the admixture of fresh air and by means of at least brief parallel operation of the air conditioner and of the air heating device. A defroster function can also be easily implemented, since the air heated by the air-heating device can be distributed by means of the vehicle fan and the air duct system provided in the vehicle. In particular, the procedure in the auxiliary heater mode can be that the air fans of the burner arrangement and the vehicle air fan are activated independently of one another, so that these two fans can be optimally operated for the respective thermal requirements or combustion requirements.

A further advantage of the embodiment according to the invention is the easy accessibility of the burner region outside the housing arrangement. This positioning has the further advantage that there are substantially no guidelines as regards the shape or constructional space of the burner region. Thus burner regions of different types can be attached to the heat exchanger body 30 without problems.

Figure 4:
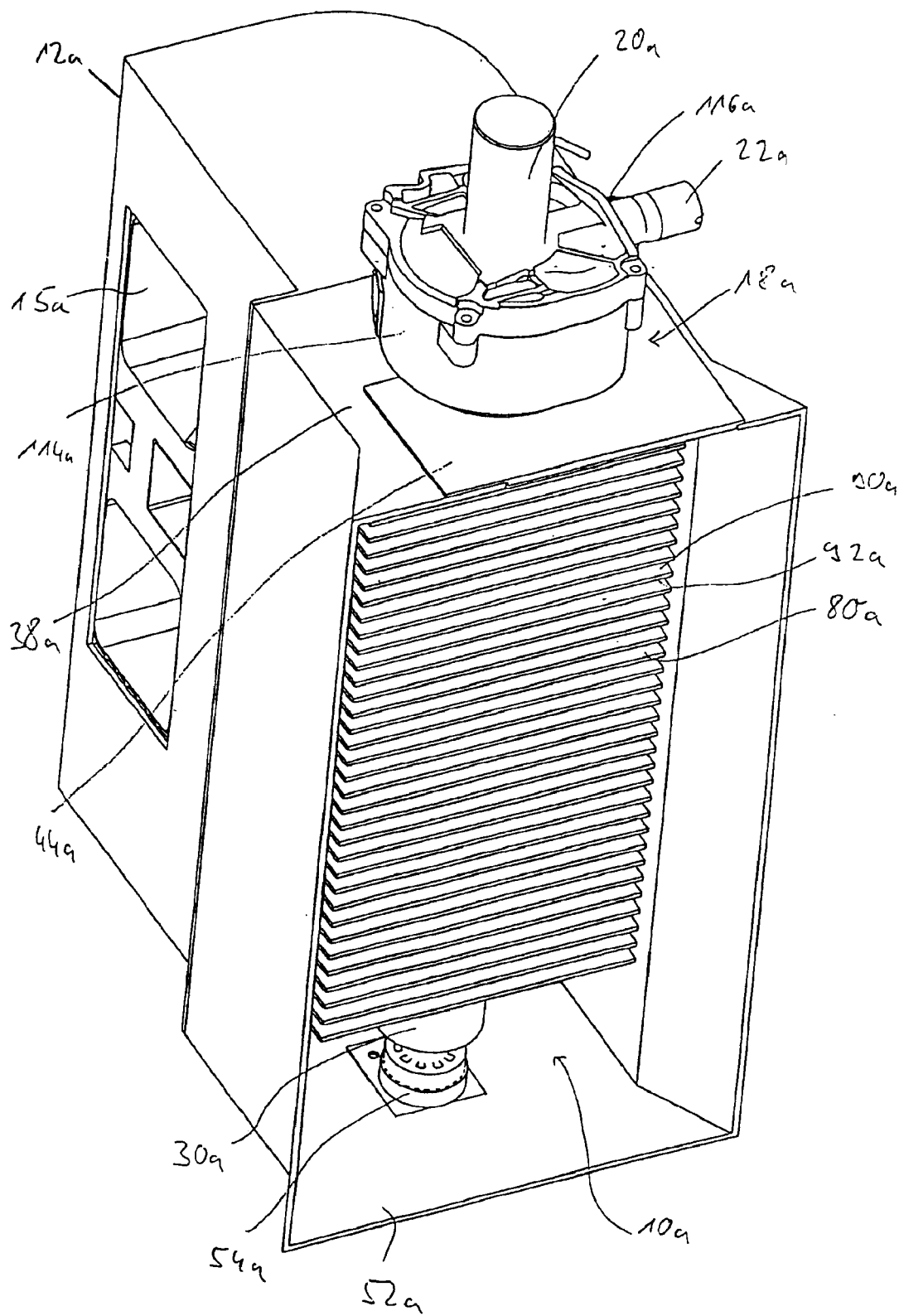
FIG. 4 shows a perspective view of a combination of an air-heating device according to the invention with a housing arrangement according to an alternative kind of embodiment, in the assembled state.
Figure 5:
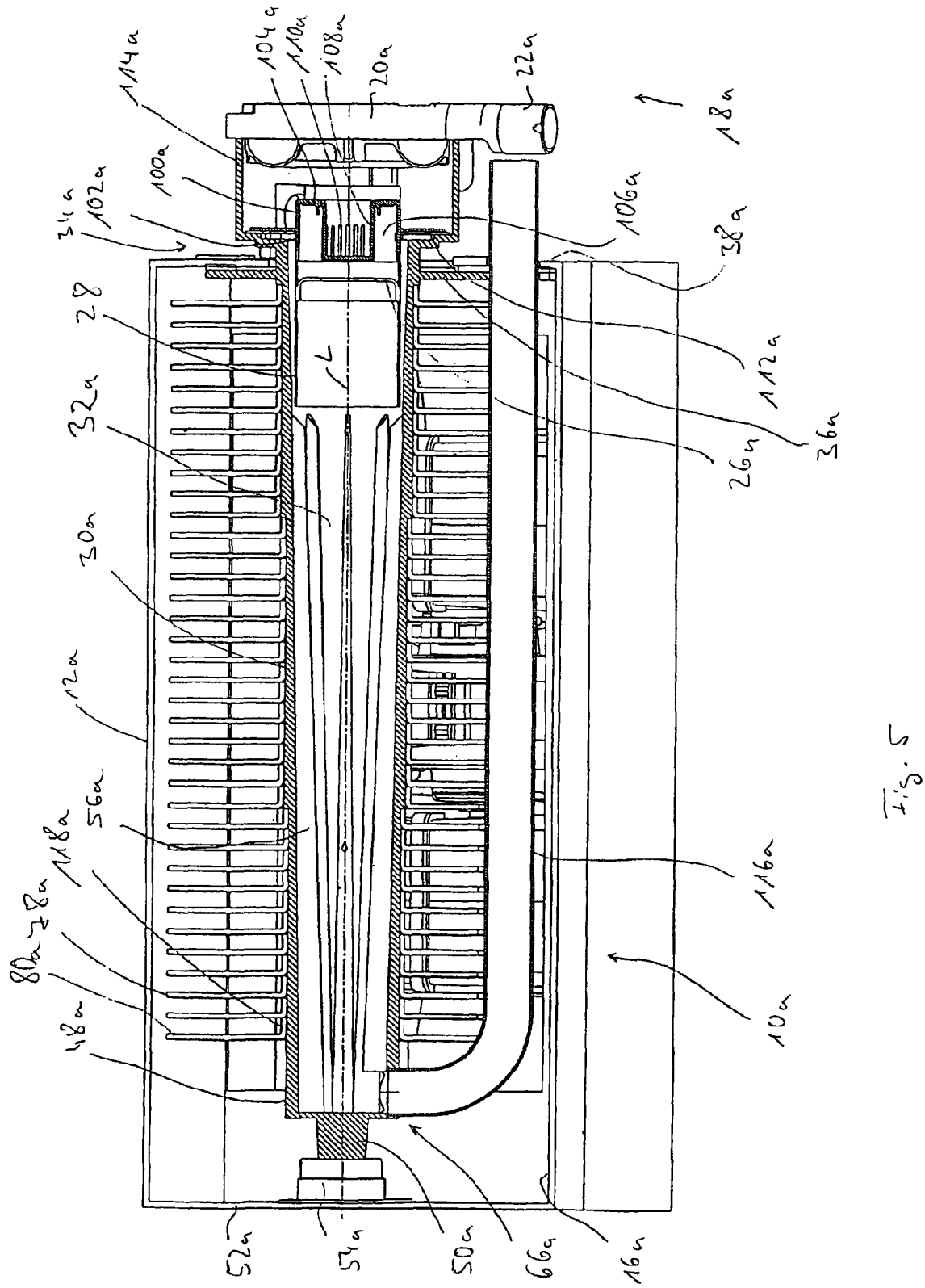
FIG. 5 shows a sectional view of the combination shown in FIG. 4, sectioned in a plane substantially transverse to a flow direction of the air stream flowing around the air-heating device.

FIGS. 4 and 5 show an alternative kind of embodiment of an air-heating device according to the invention, or a combination of a housing arrangement with such an air-heating device. Components which correspond to previously described components as regards structure or function are denoted with the same reference number with "a" appended.

A more detailed description of the construction of the burner region 18a will first be given with reference to FIG. 5. A combustion chamber housing 100a can be seen which, with an outer wall 102a and a floor wall 104a, delimits a combustion chamber denoted generally by 106a. A central air inlet pipe 108a delimits radially inward the combustion chamber, thus of annular construction, and has plural air outlet openings 110a, via which combustion air supplied by the combustion air fan 20a reaches the combustion chamber 106a. The combustion chamber housing 100a is fastened by means of a radially outward-engaging flange section 112a to a burner outer housing 114a, which is furthermore connected to the heat exchanger body 30a or is constituted integrally with this. Only with an integrated design can access to the system components, combustion air fan 20a and combustion chamber housing 100a be attained in a simple manner, without the whole air heating device having to be disassembled from the housing arrangement 12a.

As mentioned hereinabove, the combustion exhaust gases produced by combustion in the combustion chamber 106a enter the internal space 32a of the heat exchanger body 30a via a flame diaphragm 26a and a flame tube 28a. It can be seen above all in FIG. 5 that this internal space 32a is formed tapering from the end region 34a to the end region 48a, so that with decreasing temperature the combustion gases moving in this direction retain an approximately constant heat transfer characteristic.

In the embodiment shown in FIG. 5, the exhaust gas outlet 66a is constituted in the end region 48a of the heat exchanger body 30a. An exhaust gas discharge pipe 116a is there connected to the heat exchanger body 30a and then conducts the exhaust gases out of the housing arrangement 12a.

It can further be seen in the embodiment according to FIGS. 4 and 5 that the heat transfer rib modules 78a respectively have only a single, substantially disk-like heat transfer rib 80a. In their central region, the heat transfer rib modules 78a form a section 118a like a bushing, serving for thermal coupling to the outside of the heat exchanger body 30a. The heat transfer rib modules can be formed, for example, by stamping out and shaping sheet metal blanks, so that a central opening is formed in the middle and is surrounded by the bushing-like section 118a. With this bushing-like section 118a, the individual heat transfer rib modules 78a are then pushed onto the heat exchanger body 30a. This can have a correspondingly decreasing dimension in its outer region also, matching the decreasing dimension of the internal space 32a, in order to retain an approximately uniform wall thickness. It is advantageous as regards manufacturing technology to provide a step-like decrease of dimensions on the outer side, so that with a very easily manufactured cylindrical shape of the bushing section 118a a large-surface heat transfer contact is provided between the bushing sections 118a serving for thermal coupling and the heat exchanger body 30a. The individual heat transfer rib modules 78a can then be fixed to the outside of the heat exchanger body 30a, for example by soldering or adhesion, whereby good heat transfer is provided.

By simple choice of the size or shape of the heat transfer rib modules 78, particularly in the region of their heat transfer ribs 80, adaptation to different spatial circumstances in the region of the housing arrangement 12a can also be attained with this embodiment.

The embodiment shown in FIGS. 4 and 5 has the same advantages as already described hereinabove with reference to FIGS. 1–3, as regards combination, for example with a vehicle air conditioner, or the possible modes of operation on integration of such an air conditioner into the housing arrangement of such an air conditioning device.

We claim:

1. Air heating device for integration into an air-conducting housing arrangement (12; 12a), of a vehicle air conditioner, including:
    a burner region (18; 18a),
    a heat exchanger region with a heat exchanger body (30; 30a); constituted in the heat exchanger body (30; 30a), a combustion exhaust gas conducting space (32; 32a), in which hot combustion exhaust gases flow, produced by combustion in the burner region (18; 18a),
    on an outer side of the heat exchanger body (30; 30a), a heat transfer rib arrangement with numerous heat transfer ribs (80, 82; 80a) around which air conducted in the housing arrangement (12, 12a) flows, at least a portion of the heat transfer ribs (80, 82; 80a) being constituted separately from the heat exchanger body (30; 30a) and kept in heat transfer contact with this,
    wherein the heat exchanger body (30; 30a) is elongate in the direction of a body longitudinal axis (L), and wherein at least a portion of the heat transfer ribs (80, 82; 80a) for the air to be heated provides a heat transfer surface (90, 92; 90a, 92a) substantially orthogonal to the body longitudinal axis (L), and
    wherein the heat transfer rib arrangement includes at least one heat transfer rib module (78; 78a), and wherein the at least one heat transfer rib module (78; 78a) includes a coupling region (84; 118a) constituted for thermal coupling to the heat exchanger body (30; 30a), and also at least one heat transfer rib (80, 82; 80a) adjoining the coupling region (84; 118a).

2. Air heating device according to claim 1, wherein the heat exchanger body (30) has on its outside an abutment structure (72, 74) adapted to the shape of the coupling region (84), for each coupling region (84) of a heat transfer rib module (78).

3. Air heating device according to claim 2, wherein the coupling region (84) of the at least one heat transfer rib module (78) and the associated abutment structure (72, 74) is constituted elongate and at least locally curved.

4. Air heating device according to claim 1, wherein at least one heat transfer rib module (78) is, or can be, fixed to the heat exchanger body (30) by means of a retaining clamp arrangement (86) engaging on the coupling region (84) thereof.

5. Air heating device according to claim 4, wherein the retaining clamp arrangement (86) includes a retaining clamp element (86) with plural retaining clamp sections (88) for fixing plural heat transfer rib modules (78) to the heat exchanger body (30).

6. Air heating device according to claim 1, wherein the at least one heat transfer rib module (78a) is materially connected to the heat exchanger body (30a) preferably by soldering or adhesion.

7. Air heating device according to claim 1, wherein the at least one heat transfer rib module (78) includes two heat transfer ribs (80, 82) connected together by the coupling region (84) and substantially parallel to one another.

8. Air heating device according to claim 1, wherein the at least one heat transfer rib module (78a) has a bushing-like coupling region (118a) to be positioned surrounding the heat exchanger body (30a) on its outside, and adjoined by a substantially disk-like heat transfer rib (80a).

9. Air heating device for integration into an air-conducting housing arrangement (12; 12a), of a vehicle air conditioner, including:

a burner region (18; 18a), a heat exchanger region with a heat exchanger body (30; 30a); constituted in the heat exchanger body (30; 30a), a combustion exhaust gas conducting space (32; 32a), in which hot combustion exhaust gases flow, produced by combustion in the burner region (18; 18a), on an outer side of the heat exchanger body (30; 30a), a heat transfer rib arrangement with numerous heat transfer ribs (80, 82; 80a) around which air conducted in the housing arrangement (12, 12a) flows, at least a portion of the heat transfer ribs (80, 82; 80a) being constituted separately from the heat exchanger body (30; 30a) and kept in heat transfer contact with this, wherein the heat exchanger body (30; 30a) is elongate in the direction of a body longitudinal axis (L), and wherein at least a portion of the heat transfer ribs (80, 82; 80a) for the air to be heated provides a heat transfer surface (90, 92; 90a, 92a) substantially orthogonal to the body longitudinal axis (L), and wherein a fastening arrangement (36; 36a) is provided in a connecting region (34, 34a) of the heat exchanger body (30; 30a) with the burner region (18; 18a), for fixing to the housing arrangement (12, 12a) such that the heat exchanger body (30; 30a) comes to be situated substantially within an air-conducting volume region of the housing arrangement (12; 12a), and the burner region (18; 18a) comes to be situated substantially outside the air-conducting volume region of the housing arrangement (12, 12a).

10. Air heating device according to claim 1, wherein the heat exchanger body (30; 30a) is constituted with its longitudinal extent for positioning substantially orthogonal to an air flow direction (S) in an air-conducting volume region of the housing arrangement (12, 12a).

11. Combination according to claim 1, wherein the heat exchanger body (30; 30a) is positioned with its longitudinal extent substantially orthogonal to a flow direction (S) of an air flow passing through an air-conducting volume region of the housing arrangement (12, 12a).

12. Combination according to claim 1, wherein an exhaust gas outlet region (66) is constituted on the heat exchanger body (30) in a region (34) of the same positioned outside the air-conducting volume region of the housing arrangement (12).

13. Combination according to claim 1, wherein the burner region (18; 18a) has a fan arrangement (20; 20a) for introducing combustion air into the same; and wherein for operating the air heating device (10; 10a) as an auxiliary heating device, the fan arrangement (20; 20a) of the burner region (18; 18a), and additionally to this a vehicle fan arrangement for delivering an air stream through the air-conducting region of the housing arrangement (12; 12a), are activated.

14. Air heating device for integration into an air-conducting housing arrangement (12; 12a), of a vehicle air conditioner, comprising:

a burner region (18; 18a), a heat exchanger region with a heat exchanger body (30; 30a); constituted in the heat exchanger body (30; 30a), a combustion exhaust gas conducting space (32; 32a), in which hot combustion exhaust gases flow, produced by combustion in the burner region (18; 18a), and on an outer side of the heat exchanger body (30; 30a), a heat transfer rib arrangement with numerous heat transfer ribs (80, 82; 80a) around which air conducted in the housing arrangement (12, 12a) flows, wherein the heat exchanger body (30; 30a) provides a flow cross section decreasing in the direction of flow of the combustion exhaust gases leaving the burner region (18; 18a), and wherein the heat transfer rib arrangement includes at least one heat transfer rib module (78; 78a), and wherein the at least one heat transfer rib module (78; 78a) includes a coupling region (84; 118a) constituted for thermal coupling to the heat exchanger body (30; 30a), and also at least one heat transfer rib (80, 82; 80a) adjoining the coupling region (84; 118a).

15. Air heating device according to claim 14, wherein the heat exchanger body (30) has on its outside an abutment structure (72, 74) adapted to the shape of the coupling region (84), for each coupling region (84) of a heat transfer rib module (78).

16. Air heating device according to claim 14, wherein the coupling region (84) of the at least one heat transfer rib module (78) and the associated abutment structure (72, 74) is constituted elongate and at least locally curved.

17. Air heating device according to claim 14, wherein at least one heat transfer rib module (78) is, or can be, fixed to the heat exchanger body (30) by means of a retaining clamp arrangement (86) engaging on the coupling region (84) thereof.

18. Air heating device according to claim 17, wherein the retaining clamp arrangement (86) includes a retaining clamp element (86) with plural retaining clamp sections (88) for fixing plural heat transfer rib modules (78) to the heat exchanger body (30).

19. Air heating device according to claim 14, wherein the at least one heat transfer rib module (78a) is materially connected to the heat exchanger body (30a) preferably by soldering or adhesion.

20. Air heating device according to claim 14, wherein the at least one heat transfer rib module (78) includes two heat transfer ribs (80, 82) connected together by the coupling region (84) and substantially parallel to one another.

21. Air heating device according to claim 14, wherein the at least one heat transfer rib module (78*a*) has a bushing-like coupling region (118*a*) to be positioned surrounding the heat exchanger body (30*a*) on its outside, and adjoined by a substantially disk-like heat transfer rib (80*a*).

22. Air heating device according to claim 14, wherein a fastening arrangement (36; 36*a*) is provided in a connecting region (34, 34*a*) of the heat exchanger body (30; 30*a*) with the burner region (18; 18*a*), for fixing to the housing arrangement (12, 12*a*) such that the heal exchanger body (30; 30*a*) comes to be situated substantially within an air-conducting volume region of the housing arrangement (12; 12*a*), and the burner region (18; 18*a*) comes to be situated substantially outside the air-conducting volume region of the housing arrangement (12; 12*a*).

23. Air heating device according to claim 14, wherein an exhaust gas outlet section (66) is provided in the heat exchanger body (30), at a region (34) of the heat exchanger body (30) to be positioned outside an air-conducting volume region of the housing arrangement (12).

24. Air heating device according to claim 14, wherein the heat exchanger body (30; 30*a*) is constituted with its longitudinal extent for positioning substantially orthogonal to an air flow direction (S) in an air-conducting volume region of the housing arrangement (12; 12*a*).

25. Air heating device according to claim 14, wherein the heat exchanger body (30; 30*a*) provides a flow cross section decreasing in the direction away from the burner region (18; 18*a*) for the combustion exhaust gases leaving the burner region (18; 18*a*).

26. Combination of an air-conducting housing arrangement (12; 12*a*), of a vehicle air conditioner, with an air heating device (10; 10*a*), according to claim 14, wherein the air heating device (10; 10*a*) has a burner region (18; 18*a*) positioned outside an air-conducting volume region of the housing arrangement (12; 12*a*), and a heat exchanger body (30; 30*a*) positioned extending substantially in the air-conducting volume region of the housing arrangement (12; 12*a*).

27. Combination according to claim 26, wherein the heat exchanger body (30; 30*a*) is positioned with its longitudinal extent substantially orthogonal to a flow direction (S) of an air flow passing through air-conducting volume region of the housing arrangement (12, 12*a*).

28. Combination according to claim 26, wherein an exhaust gas outlet region (66) is constituted on the heat exchanger body (30) in a region (34) of the same positioned outside the air-conducting volume region of the housing arrangement (12).

29. Combination according to claim 26, wherein the burner region (18; 18*a*) has a fan arrangement (20; 20*a*) for introducing combustion air into the same; and wherein for operating the air heating device (10; 10*a*) as an auxiliary heating device, the fan arrangement (20; 20*a*) of the burner region (18; 18*a*), and additionally to this a vehicle fan arrangement for delivering an air stream through the air-conducting region of the housing arrangement (12; 12*a*), are activated.

* * * * *